(12) United States Patent
Oh et al.

(10) Patent No.: US 10,717,651 B2
(45) Date of Patent: Jul. 21, 2020

(54) METHOD OF MANUFACTURING NANOCOMPOSITE SENSOR AND NANOCOMPOSITE

(71) Applicant: ELECTRONICS AND TELECOMMUNICATIONS RESEARCH INSTITUTE, Daejeon (KR)

(72) Inventors: Hyun-Woo Oh, Daejeon (KR); Wangjoo Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/154,505

(22) Filed: Oct. 8, 2018

(65) Prior Publication Data
US 2019/0352181 A1 Nov. 21, 2019

(30) Foreign Application Priority Data
May 21, 2018 (KR) .......................... 10-2018-0057912

(51) Int. Cl.
*C01B 32/159* (2017.01)
*H01B 1/24* (2006.01)
*C09D 183/04* (2006.01)
*B82Y 30/00* (2011.01)
*B82Y 40/00* (2011.01)

(52) U.S. Cl.
CPC .......... *C01B 32/159* (2017.08); *C09D 183/04* (2013.01); *H01B 1/24* (2013.01); *B82Y 30/00* (2013.01); *B82Y 40/00* (2013.01); *C01B 2202/02* (2013.01)

(58) Field of Classification Search
None
See application file for complete search history.

(56) References Cited

U.S. PATENT DOCUMENTS

| 2008/0299298 A1 | 12/2008 | Kim et al. |
| 2014/0316152 A1 | 10/2014 | Kwon et al. |
| 2019/0256358 A1* | 8/2019 | Bao ........................ C01B 32/194 |

* cited by examiner

*Primary Examiner* — William D Young (57) ABSTRACT

Provided is a method of manufacturing a nanocomposite sensor including providing carbon nanotubes and a polymer to a reactor, applying a magnetic field to inside the reactor, and stirring the carbon nanotubes and the polymer to prepare a first conductive composition, adding a curing agent to the first conductive composition to prepare a second conductive composition, defoaming the second conductive composition, and curing the defoamed second conductive composition.

4 Claims, 10 Drawing Sheets

METHOD OF MANUFACTURING NANOCOMPOSITE SENSOR AND NANOCOMPOSITE

CROSS-REFERENCE TO RELATED APPLICATIONS

This U.S. non-provisional patent application claims priority under 35 U.S.C. § 119 of Korean Patent Application No. 10-2018-0057912, filed on May 21, 2018, the entire contents of which are hereby incorporated by reference.

BACKGROUND

The present disclosure herein relates to a method of manufacturing a nanocomposite sensor, and more particularly, to a method of manufacturing a nanocomposite sensor containing carbon nanotubes.

A nanocomposite is a composite material prepared by dispersing nano-sized organic or inorganic materials in a matrix material. A nanocomposite has better physical properties than a conventional polymer resin, thereby being widely used as industrial materials. Particularly, a nanocomposite containing carbon nanotubes is excellent in tensile strength, bending strength, impact resistance and electrical properties.

A sensor may be manufactured using a nanocomposite containing carbon nanotubes. As an example, when carbon nanotubes are added to a polymer having elasticity, the electrical properties thereof may change according to changes in shape, such as compression or elongation. Pressure sensors, strain sensors, load cells, and the like may be manufactured using such properties of a nanocomposite. The most important part in manufacturing a nanocomposite containing carbon nanotubes is to improve the dispersibility of the carbon nanotube. In general, carbon nanotubes are present in an aggregated state due to Van der waals force. In order to improve the electrical properties of a nanocomposite sensor, research on a method for improving the dispersibility of carbon nanotubes in a nanocomposite is necessary.

SUMMARY

The present disclosure provides a method of manufacturing a nanocomposite sensor with improved dispersibility of carbon nanotubes.

An embodiment of the inventive concept provides a method of manufacturing a nanocomposite sensor including providing carbon nanotubes and a polymer to a reactor, applying a magnetic field to inside the reactor and stirring the carbon nanotubes and the polymer to prepare a first conductive composition, adding a curing agent to the first conductive composition to prepare a second conductive composition, defoaming the second conductive composition, and curing the defoamed second conductive composition.

In an embodiment, the magnetic field may be applied in a first direction, and the stirring of the carbon nanotubes and the polymer may include rotating the carbon nanotubes and the polymer around a first rotation axis which is parallel to the first direction In an embodiment, the first rotation axis may cross the reactor.

In an embodiment, the stirring of the carbon nanotubes and the polymer may include rotating the reactor around a second rotation axis which is spaced apart from the first rotation axis.

In an embodiment, the second rotation axis may either cross the first rotation axis or be in a skew position.

In an embodiment, the method may further include defoaming the first conductive composition.

In an embodiment, the defoaming of the first conductive composition may include rotating the reactor around a rotation axis which is defined outside the reactor.

In an embodiment, the method may further include providing an electrode on the cured second conductive composition.

In an embodiment of the inventive concept, a method of manufacturing a nanocomposite includes providing carbon nanotubes and a polymer to a reactor, applying a magnetic field to inside the reactor in a first direction and rotating the reactor around a first rotation axis which crosses the reactor, and while the reactor is rotating around the first rotation axis, rotating the reactor around a second rotation axis which is spaced apart from the first rotation axis, wherein the first rotation axis is parallel to the first direction, and the second rotation axis is inclined with respect to the first rotation axis.

In an embodiment, the carbon nanotubes may include a first carbon nanotube having a positive charge and a second carbon nanotube having a negative charge.

In an embodiment, the method may further include rotating the reactor around the first rotation axis to apply Lorentz force of different directions to the first carbon nanotube and the second carbon nanotube.

In an embodiment, the carbon nanotubes may include a multi-walled carbon nanotube.

In an embodiment, the method may further include providing mixing balls in the reactor before rotating the reactor, wherein the mixing balls include non-magnetic bodies.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Those skilled in the art will recognize that the concepts of the inventive concept may be performed in any suitable environment.

The terms used herein is for the purpose of describing embodiments and is not intended to limit the inventive concept. In the present specification, singular forms include plural forms unless the context clearly dictates otherwise. As used herein, the terms "comprises" and/or "comprising" are intended to be inclusive of the stated components, steps, operations and/or elements, and do not preclude the presence or addition of one or more other components, steps, operations, and/or elements.

The embodiments described and exemplified herein also include the complementary embodiments thereof. The same reference numerals refer to like elements throughout the specification. The terms used in the embodiments of the inventive concept may be interpreted as commonly known to those skilled in the art unless otherwise defined.

Hereinafter, a method of manufacturing a nanocomposite sensor and a nanocomposite according to the inventive concept will be described with reference to the accompanying drawings.

Figure 1:
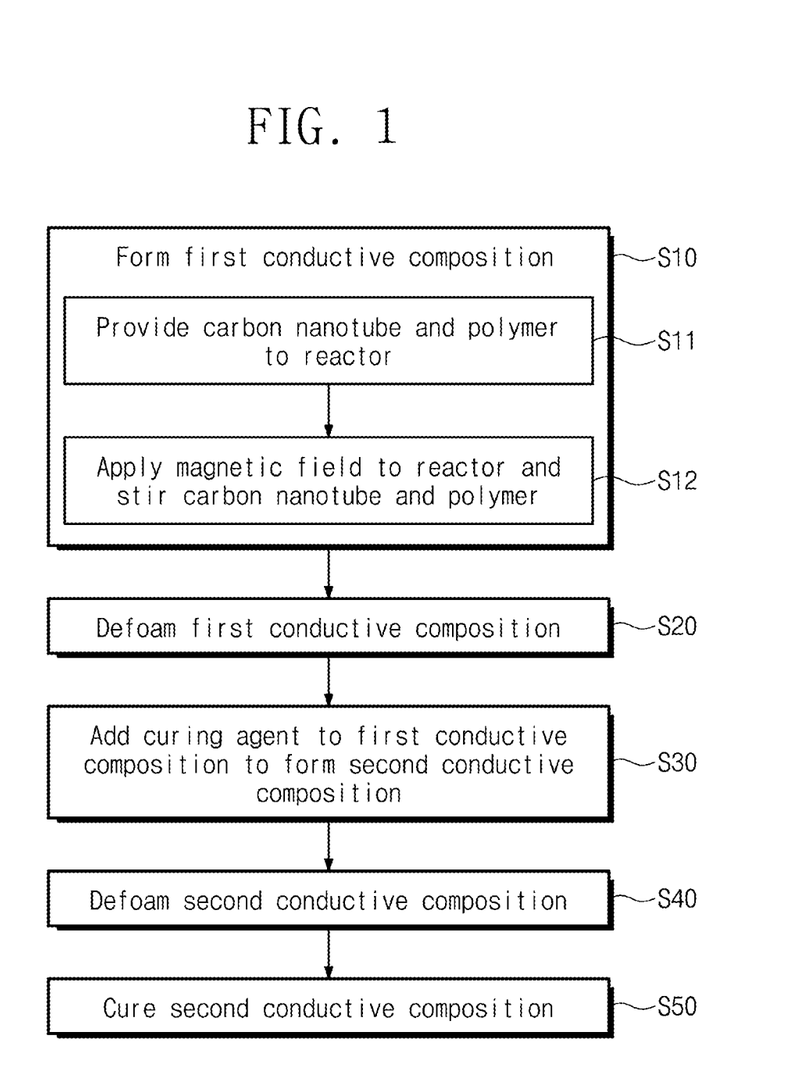
FIG. 1 is a flow chart for explaining a method of manufacturing a nanocomposite sensor according to an embodiment of the inventive concept.

FIG. 1 is a flow chart for explaining a method of manufacturing a nanocomposite sensor according to an embodiment of the inventive concept. FIG. 2 to FIG. 5 are drawings for explaining a method of preparing a first conductive composition according to an embodiment of the inventive concept.

Referring to FIG. 1 to FIG. 5, a first conductive composition 10 may be prepared (S10). The first conductive composition 10 may be a nanocomposite containing a polymer 12 and carbon nanotubes 14. The preparing of the first conductive composition 10 (S10) may include providing the carbon nanotubes 14 and the polymer 12 to a reactor 110 (S11), and applying a magnetic field MF to inside the reactor 110 and stirring the carbon nanotubes 14 and the polymer 12 (S12).

Figure 2:
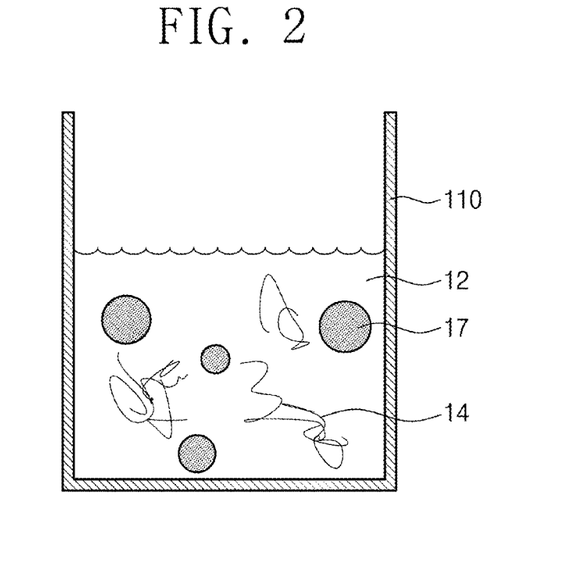
FIG. 2 to FIG. 5 are drawings for explaining a method of preparing a first conductive composition according to an embodiment of the inventive concept.
Figure 3:
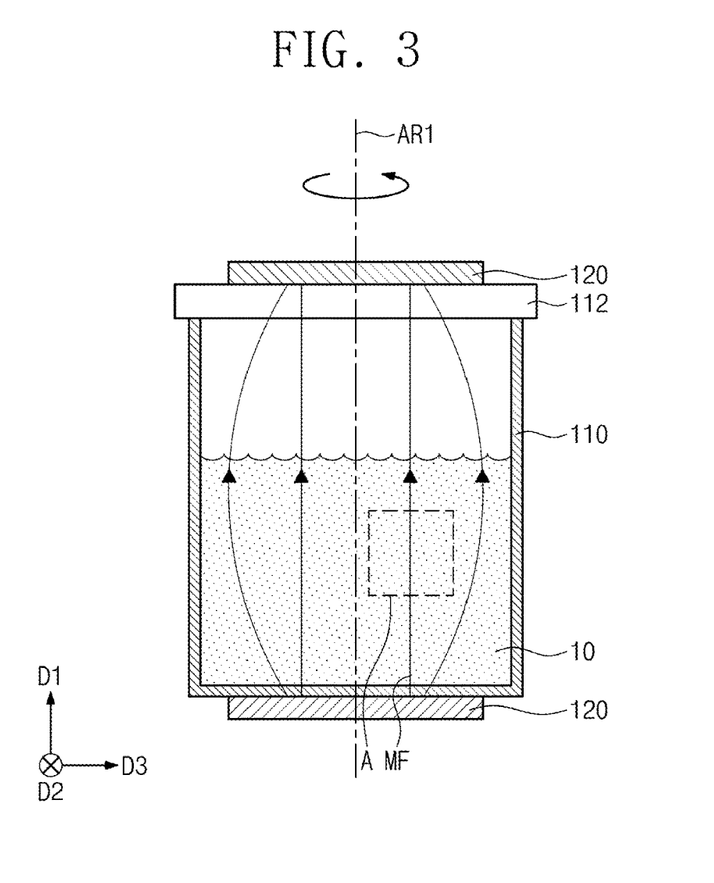

Specifically, as shown in FIG. 2 and FIG. 3, the reactor 110 may be provided. The reactor 110 may have an inner space for mixing a plurality of materials. The reactor 110 may have, for example, a cylindrical shape, the top of which is open and the bottom of which is closed. The reactor 110 may have a shape such that the rotation thereof may be facilitated. For example, the reactor 110 may have a symmetrical shape with respect to a first rotation axis AR1 which vertically crosses the center of gravity thereof. The reactor 110 may include a material having high magnetic permeability such that the magnetic field MF applied from the outside thereof may be transmitted into the inside thereof. The reactor 110 may include, for example, plastic or ceramic.

The carbon nanotubes 14 and the polymer 12 may be provided in the inner space of the reactor 110 (S11). The carbon nanotubes 14 and the polymer 12 both to be provided to the reactor 110 may be weighed in advance to have a predetermined weight ratio. For example, the carbon nanotubes 14 may have a concentration of 0.1 wt % to 0.5 wt % based on the polymer 12.

The polymer 12 may include an insulating polymer. The polymer 12 may include, for example, polydimethylsiloxane (PDMS), poly-4-vinyl-phenol (PVP), polyimide (PI), polystyrene (PS), polyvinylidene fluoride (PVDF), polystyrene-butadiene-styrene (SBS), or a combination thereof.

The carbon nanotubes 14 may be provided in the polymer 12. The carbon nanotubes 14 may be provided in an aggregated state due to Van der waals force. As an example, the carbon nanotubes 14 may include a single-walled carbon nanotube. The diameter of the single-walled carbon nanotube may be about 1 nm. Due to the influence of Van der waals force, the single-walled carbon nanotube may be present in the polymer 12 by being aggregated in the form of a bundle having a width of tens to hundreds of nanometers. As another example, the carbon nanotubes 14 may include a multi-walled carbon nanotube. The multi-walled carbon nanotube may have a diameter bigger than that of the single-walled carbon nanotube. Due to the influence of Van der waals force, the multi-walled carbon nanotube may be present in the polymer 12 by being aggregated in the form of an entangled chain. The aggregated carbon nanotubes 14 may be separated by a stirring step (S12) to be described later and dispersed in the polymer 12. Thus, a nanocomposite and a nanocomposite sensor having excellent and uniform electrical properties may be provided.

According to an example, as shown in FIG. 2, mixing balls 17 may further be provided in the inner space of the reactor 110. The mixing balls 17 may have various sizes. The mixing balls 17 may have high hardness and elastic modulus. The mixing balls 17 may collide with each other in the stirring step S12 to help the aggregated carbon nanotubes 14 disperse. For example, the mixing balls 17 may move irregularly inside the reactor 110 in the stirring step (S12). The irregular movement of the mixing balls 17 may be derived from the rotational motion of the first rotation axis AR1 and a second rotation axis AR2 to be described later with reference to FIG. 5. The mixing balls 17 may include a non-magnetic body so as not to be affected by the magnetic field MF applied to inside the reactor 110. The mixing balls 17 may be, for example, ceramic balls containing ceramic.

Referring back to FIG. 1, FIG. 3 to FIG. 5, the magnetic field MF may be applied to inside the reactor 110, and the carbon nanotubes 14 and the polymer 12 may be stirred (S12). Thus, the first conductive composition 10 may be prepared.

Before the carbon nanotubes 14 and the polymer 12 are stirred, the reactor 110 may be sealed by a cover 112. Next, the magnetic field MF may be applied in a direction parallel to a first direction D1. The stirring of the carbon nanotubes 14 and the polymer 12 may include rotating the carbon nanotubes 14 and the polymer 12 around the first rotation axis AR1 which is parallel to the first direction D1.

Figure 4A:
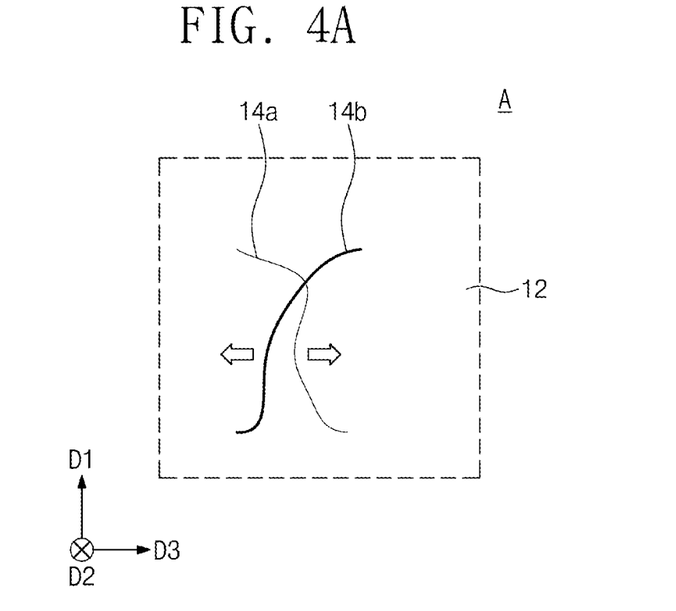
Figure 4B:
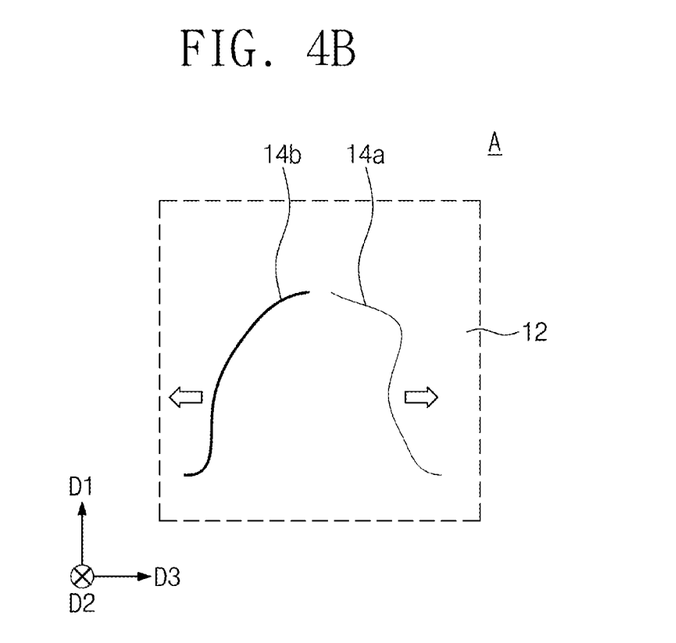

Specifically, as shown in FIG. 4A and FIG. 4B, the carbon nanotubes 14 may include a first carbon nanotube 14a and a second carbon nanotube 14b which are aggregated with each other. The first carbon nanotube 14a and the second carbon nanotube 14b may be charged with different electrostatic charges. For example, the first carbon nanotube 14a may be charged with a negative charge, and the second carbon nanotube 14b may be charged with a positive charge. As shown in FIG. 3, magnetic force generating units 120 may be disposed on the top and the bottom of the reactor 110. The magnetic force generating units 120 may be disposed spaced apart from each other in the first direction D1 while having the reactor 110 therebetween. The magnetic force generating units 120 may apply the magnetic field MF to inside the reactor 110 in a direction parallel to the first direction D1. For example, the direction of the magnetic field MF may be directed from the bottom of the reactor 110 to the top of the reactor 110.

The reactor 110 may rotate around the first rotation axis AR1 which is parallel to the first direction D1. As the reactor 110 rotates, the carbon nanotubes 14 in the reactor 110 may also rotate around the first rotation axis AR1. More specifically, the carbon nanotubes 14 may travel in the reactor 110 in a direction perpendicular to the direction of the magnetic field MF. Since the first carbon nanotube 14a and the second carbon nanotube 14b are charged with different electrostatic charges, the first carbon nanotube 14a and the second carbon nanotube 14b may be subjected to Lorentz force of different directions. For example, the first carbon nanotube 14a may be subjected to Lorentz force in a direction away from the first rotation axis AR1, and the second carbon nanotube 14b may be subjected to Lorentz force in a direction toward the first rotation axis AR1. Each of the carbon nanotubes 14 may be subjected to a different degree of Lorentz force depending on the degree to which each of the carbon nanotubes 14 is charged. Thus, the dispersibility of the carbon nanotubes 14 in the first conductive composition 10 may be improved.

Figure 5:
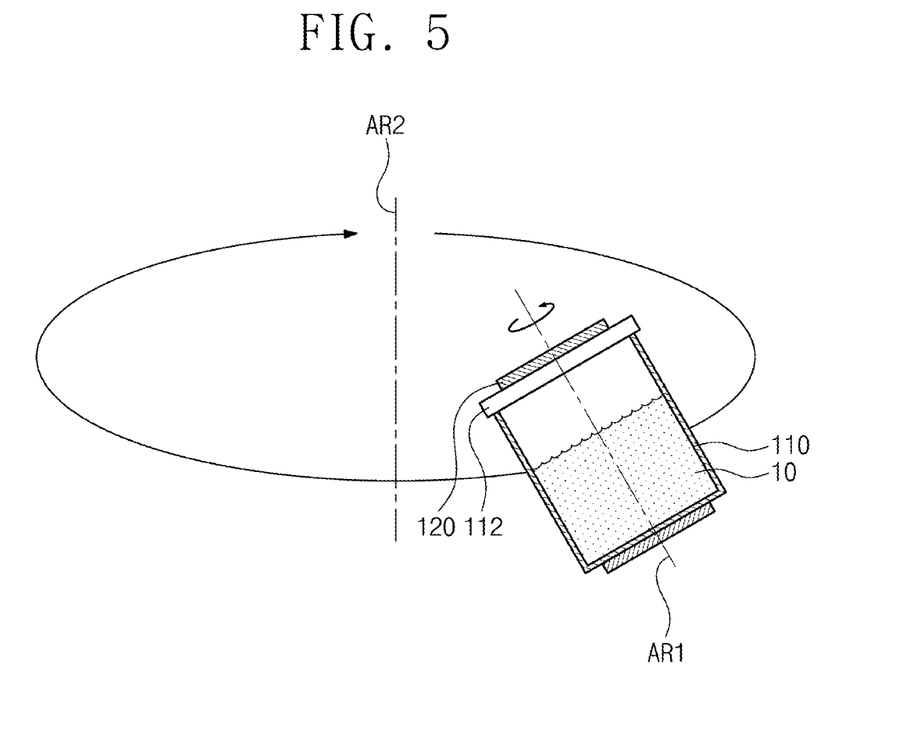

According to an example, as shown in FIG. 5, the stirring of the carbon nanotubes 14 and the polymer 12 may include rotating the reactor 110 around the second rotation axis AR2 which is spaced apart from the first rotation axis AR1. The second rotation axis AR2 may be defined outside the reactor 110. The reactor 110 may rotate around the first rotation axis AR1, and at the same time, rotate around the second rotation axis AR2. By the rotation around the first rotation axis AR1, the carbon nanotubes 14 in the reactor 110 may be subjected to Lorentz force. The rotation around the second rotation axis AR2 may help the dispersion the carbon nanotubes 14 caused by Lorentz force. According to an example, the second rotation axis AR2 may not be parallel to the first rotation axis AR1 by being inclined with respect to the first rotation axis AR1. In other words, the second rotation axis AR may either cross the first rotation axis AR1 or be in a skew position. Thus, materials in the reactor 110 may move irregularly while the stirring step (S12) is performed, so that the dispersibility of the carbon nanotubes 14 may be improved.

Figure 6:
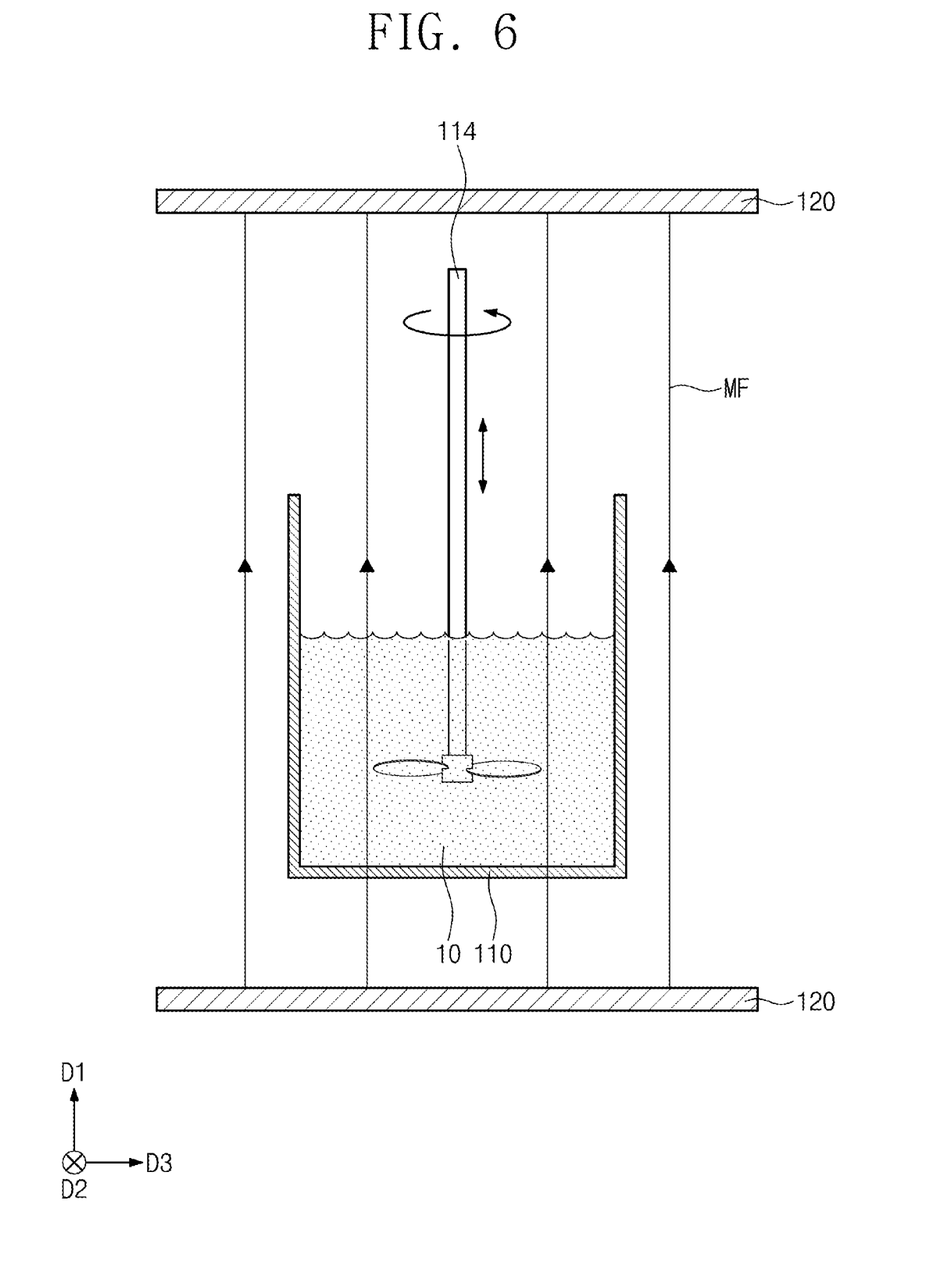
FIG. 6 is a drawing for explaining a method of stirring carbon nanotubes and a polymer according to another embodiment of the inventive concept.

FIG. 6 is a drawing for explaining a method of stirring carbon nanotubes and a polymer according to another embodiment of the inventive concept. To simplify the explanation, descriptions of redundant configurations may be omitted.

Referring to FIG. 6, unlike the explanation given with reference to FIG. 3, the carbon nanotubes 14 and the polymer 12 may be stirred using a stirring rod 114. Specifically, the magnetic force generating units 120 may be disposed above and below the reactor 110. The magnetic force generating units 120 may apply magnetic force to inside the reactor 110 in a direction parallel to the first direction D1.

A plurality of wings may be installed at one end of the stirring rod 114. The polymer 12 and the carbon nanotubes 14 may be rotated using the stirring rod 114. Similar to the explanation given with reference to FIGS. 4A and 4B, the carbon nanotubes 14 rotating in the magnetic field MF may be subjected to a different degree of Lorentz force depending on the type of charge with which the carbon nanotubes 14 are charged and the degree to which the carbon nanotubes 14 are charged. Thus, the aggregated carbon nanotubes 14 may be dispersed in the polymer 12. According to an example, the stirring rod 114 may rotate in one direction, and at the same time, move in the first direction D1 repeatedly. Thus, materials in the reactor 110 may move irregularly, and the dispersion of the carbon nanotubes 14 by Lorentz force may be facilitated.

FIG. 7 to FIG. 12 are drawings for explaining a method of manufacturing a nanocomposite sensor according an embodiment of the inventive concept.

Figure 7:
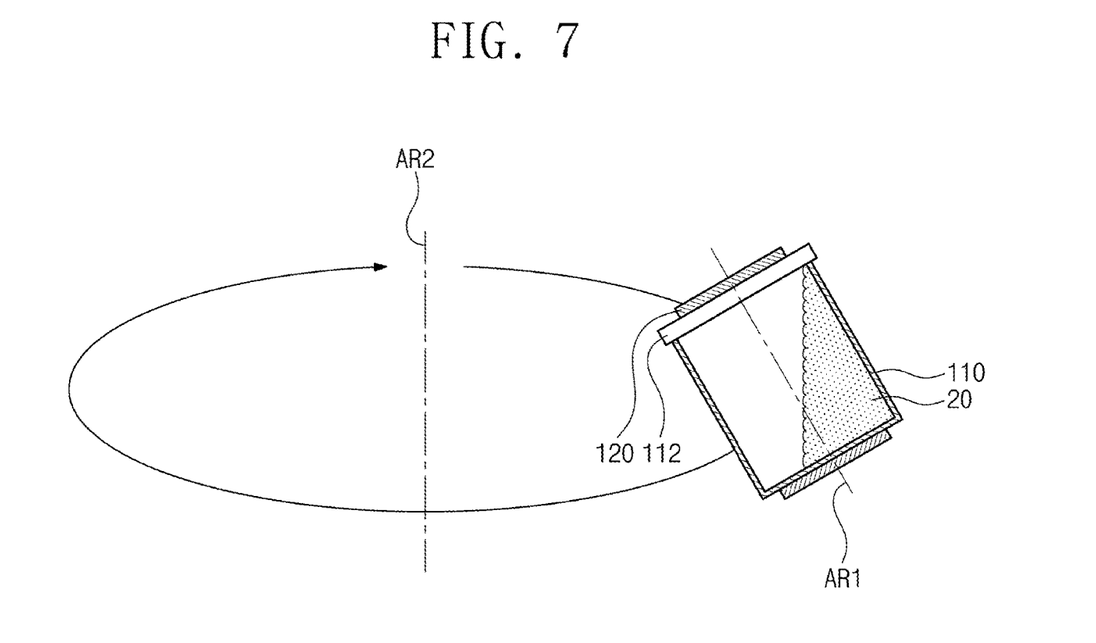
FIG. 7 to FIG. 12 are drawings for explaining a method of manufacturing a nanocomposite sensor according an embodiment of the inventive concept.

Referring to FIG. 1 and FIG. 7, the first conductive composition 10 may be defoamed (S20). The defoaming of the first conductive composition 10 may include rotating the reactor 110 around a rotation axis defined outside the reactor 110. For example, the rotation axis defined outside the reactor 110 may be the second rotation axis AR2 described with reference to FIG. 5. By rotating the reactor 110 around the second rotation axis AR2, force may be applied to the first conductive composition 10 in a direction away from the second rotation axis AR2. The defoaming may be performed due to the difference in density between the first conductive composition 10 and bubbles in the first conductive composition 10. At this time, the reactor 110 may not rotate around the first rotation axis AR1. Thus, the irregular motion of the first conductive composition 10 may be prevented, so that an effective defoaming process may be performed. While the defoaming process is performed, as the first conductive composition 10 is subjected to a constant directional force, the degree of curvature of the carbon nanotubes 14 may be reduced While the defoaming process is performed, the bubbles generated in the first conductive composition 10 may help the carbon nanotubes 14 spread. As shown in FIG. 7, the second rotation axis AR2 may be inclined with respect to the first rotation axis AR1. Therefore, while the defoaming process is performed, the first conductive composition 10 may be placed obliquely to an inner wall of the reactor 110 due to centrifugal force.

Figure 8:
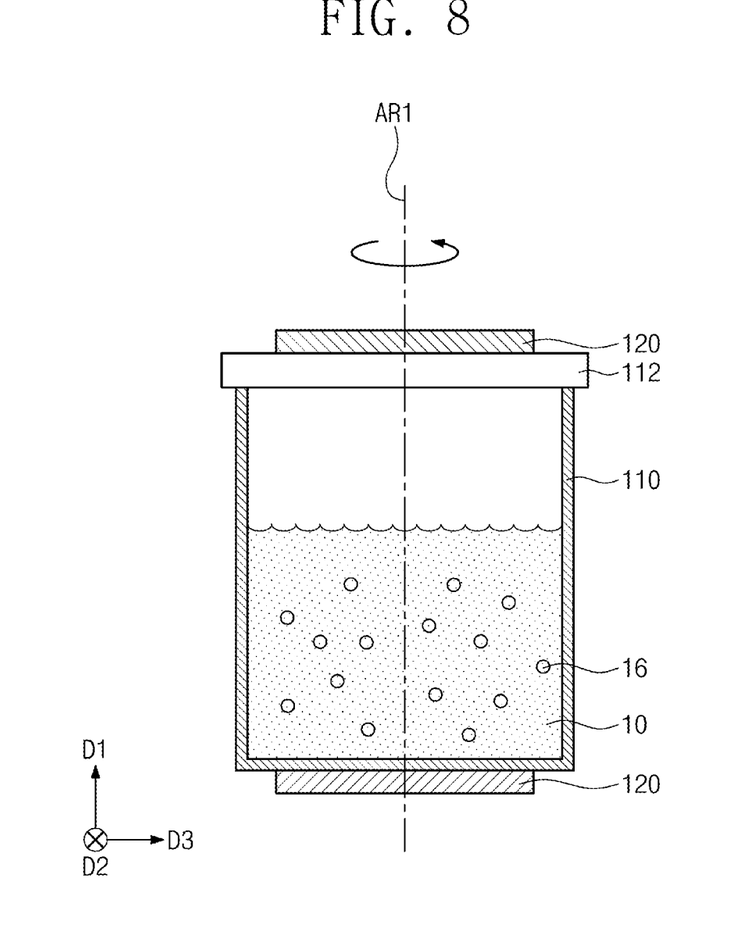
Figure 9:
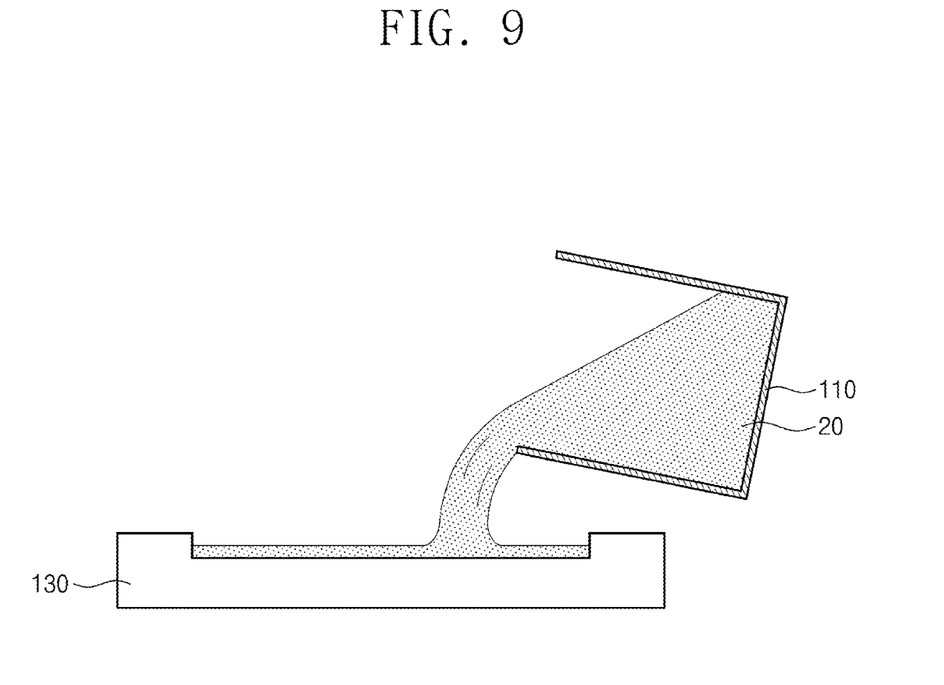

Referring to FIG. 1, FIG. 8 and FIG. 9, a curing agent 16 may be added to the first conductive composition 10 to prepare a second conductive composition 20 (S30). The preparing of the second conductive composition 20 may include stirring the first conductive composition 10 and the curing agent 16. The method for stirring the first conductive composition 10 and the curing agent 16 is not particularly limited. According to an example, the stirring of the first conductive composition 10 and the curing agent 16 may be the same as/similar to the stirring step (S12) described with reference to FIG. 2, FIG. 5, and FIG. 6.

Figure 10:
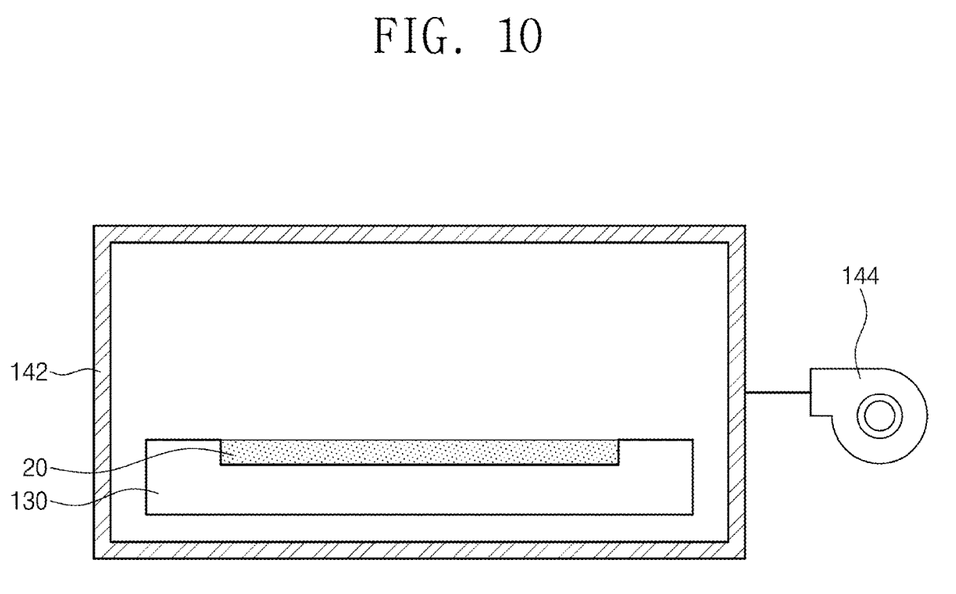

Referring to FIG. 1, FIG. 9 and FIG. 10, the second conductive composition 20 may be defoamed (S40). First, a mold 130 having a concave part of a shape of a nanocomposite sensor to be formed may be prepared. The second conductive composition 20 may be filled in the concave part of the mold 130. Next, the second conductive composition 20 may be defoamed in a vacuum atmosphere. The defoaming process may be, as shown in FIG. 10, performed in a first chamber 142. The degree of vacuum inside the first chamber 142 may be controlled by a vacuum pump 144 communicating with the first chamber 142.

Figure 11:
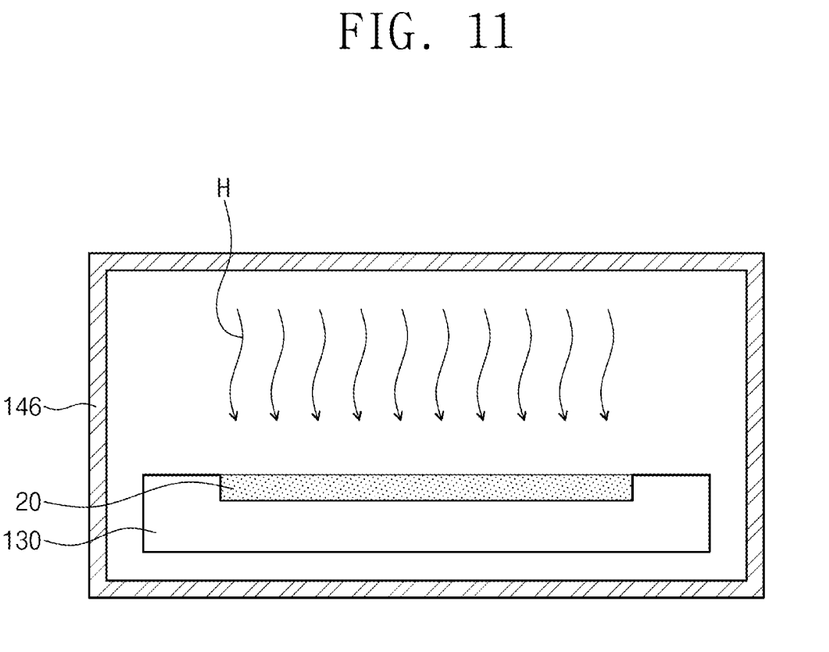
Figure 12:
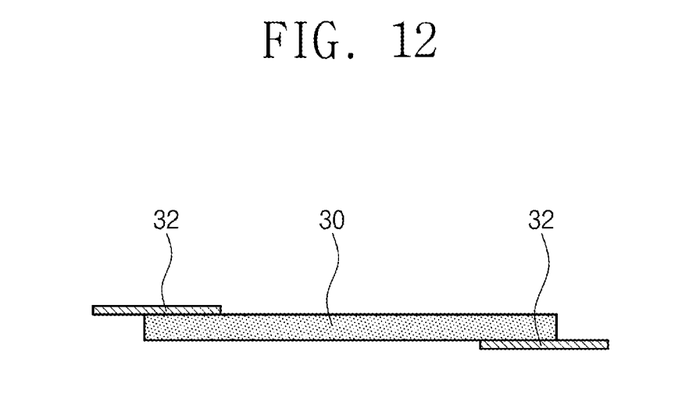

Referring to FIG. 1, FIG. 11 and FIG. 12, the second conductive composition 20 may be cured (S50). The curing of the second conductive composition 20 may include performing heat treatment H on the second conductive composition 20. The heat treatment H may be performed inside the second chamber 146. The heat treatment H may be, for example, performed at a temperature of about 70° C. for about 1 hour. According to an example, the defoaming of the second conductive composition 20 (S40) and the curing of the second conductive composition 20 (S50) may be performed in situ in the same chamber. According to an example, electrodes 32 may further be provided on the cured second conductive composition 20.

A cured second conductive composition 30 (hereinafter, a nanocomposite sensor) may serve as a flexible sensor for measuring pressure or tension. For example, when pressure or tension is applied to the nanocomposite sensor 30, the resistance of the nanocomposite sensor 30 may be changed.

By measuring the resistance change of the nanocomposite sensor 30, the pressure or the tension applied to the nanocomposite sensor 30 may be sensed.

Figure 13A:
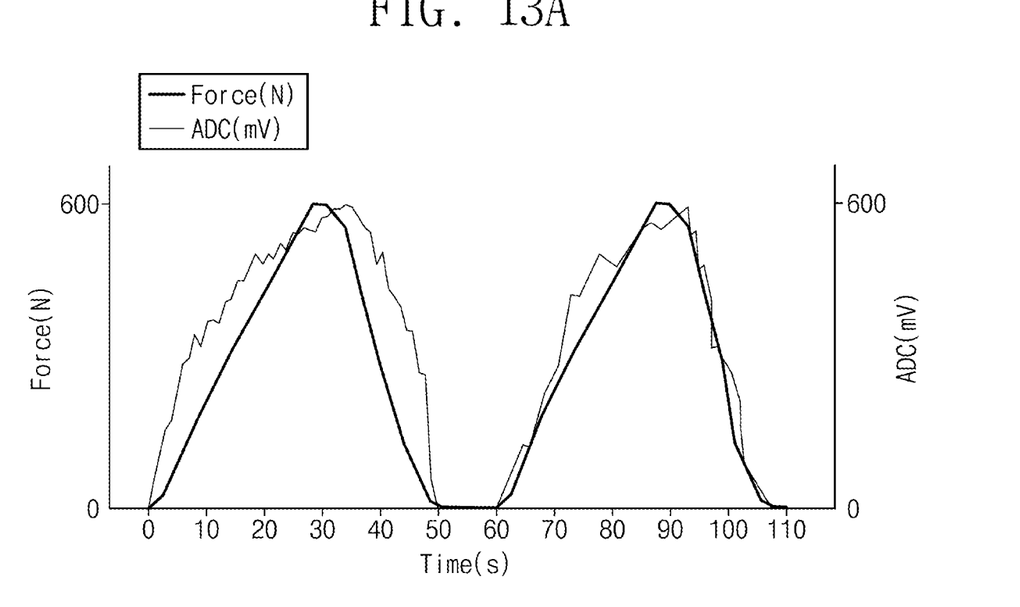
FIG. 13A is a graph showing sensing properties of a nanocomposite sensor manufactured according to Experimental Example 1 of the inventive concept.
Figure 13B:
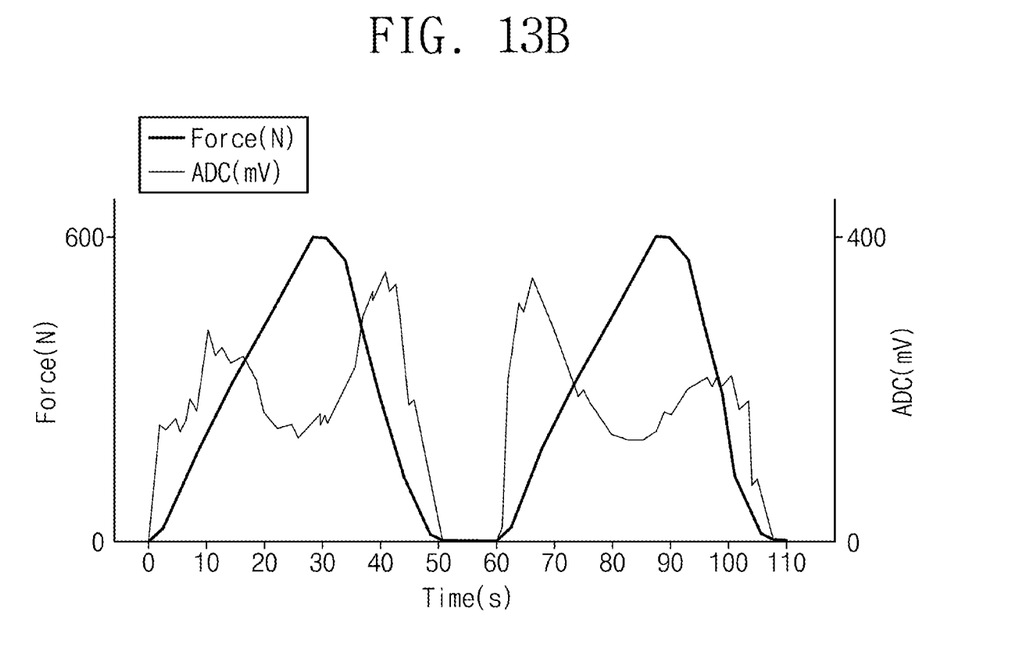
FIG. 13B is a graph showing sensing properties of a nanocomposite sensor manufactured according to Comparative Example 1 of the inventive concept.

FIG. 13a is a graph showing sensing properties of a nanocomposite sensor manufactured according to Experimental Example 1 of the inventive concept. FIG. 13b is a graph showing sensing properties of a nanocomposite sensor manufactured according to Comparative Example 1 of the inventive concept.

Experimental Example 1

According to embodiments of the inventive concept, a nanocomposite sensor containing a polymer and carbon nanotubes was manufactured. The sensing properties of the manufactured nanocomposite sensor were measured and shown in FIG. 13A.

Specifically, a multi-walled carbon nanotube having 0.3 wt % with respect to PDMS and PDMS was provided inside a reactor, and a magnetic field of about 1000 gauss was applied to inside the reactor. Next, the reactor was rotated at 200 RPM around a first rotation axis, and at the same time, revolved at 750 RPM around a second rotation axis to manufacture a nanocomposite. A primary defoaming process was performed on the nanocomposite. Sylgard 184 was added as a curing agent to the defoamed nanocomposite, and a stirring process, a secondary defoaming process, and a curing process were sequentially performed thereon to manufacture a nanocomposite sensor.

Pressure of 600 N/m$^2$ was gradually applied to the manufactured nanocomposite sensor and then released, repeatedly. At this time, by measuring ADC voltage at both ends of the nanocomposite sensor, the resistance change of the nanocomposite sensor was measured. Referring to FIG. 13A, it can be seen that as the pressure applied to the nanocomposite sensor increased, the ADC voltage of the nanocomposite sensor increased as well.

Comparative Example 1

The same processes as in Experimental Example 1 were performed to manufacture a nanocomposite sensor. However, in the comparative example, a magnetic field was not applied to inside the reactor when the carbon nanotube and the PDMS were stirred. Next, the sensing properties of the nanocomposite sensor manufactured according to Comparative Example 1 were measured and shown in FIG. 13A. The same method as in Experimental Example 1 was used to measure the sensing properties.

Referring to FIG. 13B, in the case of the nanocomposite sensor manufactured according to Comparative Example 1, even though the applied pressure was increased, a period in which the ADC voltage was decreased was observed. In addition, it can be seen that the shape of the ADC voltage graph changed with each measurement. The sensing properties of the nanocomposite sensor manufactured according to Comparative Example 1 are the sensing properties which occur when carbon nanotubes are not uniformly dispersed in a polymer. Thus, it can be seen that in the case in which a magnetic field is applied when carbon nanotubes and a polymer are stirred, the dispersibility of the carbon nanotube improves.

According to the embodiments of the inventive concept, when carbon nanotubes and a polymer are stirred, by applying an external magnetic field, aggregated carbon nanotubes may be uniformly dispersed in the polymer. Therefore, a method of manufacturing a nanocomposite sensor having high sensing sensitivity and reproducibility may be provided.

It will be understood by those skilled in the art that various changes in form and details may be made therein without departing from the spirit and scope of the inventive concept as defined in the appended claims. In addition, the embodiments disclosed in the present inventive concept are not intended to limit the technical spirit of the present inventive concept, and all technical ideas within the scope of the following claims and equivalents thereof should be construed as falling within the scope of the present inventive concept.

What is claimed is:

1. A method of manufacturing a nanocomposite, comprising:
    providing carbon nanotubes and a polymer to a reactor;
    applying a magnetic field to inside the reactor in a first direction, and rotating the reactor around a first rotation axis which crosses the reactor; and
    while the reactor is rotating around the first rotation axis, rotating the reactor around a second rotation axis which is spaced apart from the first rotation axis, wherein the first rotation axis is parallel to the first direction, and the second rotation axis is inclined with respect to the first rotation axis.

2. The method of claim 1, wherein the carbon nanotubes comprise a first carbon nanotube having a positive charge and a second carbon nanotube having a negative charge.

3. The method of claim 1, wherein the carbon nanotubes comprise a multi-walled carbon nanotube.

4. The method of claim 1 further comprising providing mixing balls in the reactor before rotating the reactor, wherein the mixing balls comprise non-magnetic bodies.

* * * * *